United States Patent

Yamamuro et al.

[11] Patent Number: 5,829,824
[45] Date of Patent: *Nov. 3, 1998

[54] VEHICLE REAR BODY STRUCTURE AND METHOD OF MOUNTING SAME

[75] Inventors: Shiro Yamamuro; Kimihito Hayakawa; Yuta Urushiyama; Nobuo Aizawa, all of Saitama-ken, Japan

[73] Assignee: Honda Giken Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 594,691

[22] Filed: Jan. 31, 1996

[30] Foreign Application Priority Data

Feb. 17, 1995 [JP] Japan ................................. 7-029496

[51] Int. Cl.$^6$ ................................................ B62D 25/20
[52] U.S. Cl. ............................................. 296/204; 296/29
[58] Field of Search .................................. 296/203, 195, 296/204, 29, 30

[56] References Cited

U.S. PATENT DOCUMENTS

| | | | |
|---|---|---|---|
| 3,541,668 | 11/1970 | Wessells, III et al. | 296/193 X |
| 4,848,835 | 7/1989 | DeRees | 296/204 |
| 4,875,733 | 10/1989 | Chado et al. | 296/195 |
| 5,018,780 | 5/1991 | Yoshii et al. | 296/195 X |
| 5,110,177 | 5/1992 | Akio | 296/204 X |
| 5,180,206 | 1/1993 | Toyoda | 296/195 X |
| 5,409,289 | 4/1995 | Kalian et al. | 296/194 X |
| 5,472,259 | 12/1995 | Akiyama et al. | 296/204 |
| 5,567,005 | 10/1996 | Kosuge et al. | 296/204 |

FOREIGN PATENT DOCUMENTS 64-26582  8/1987  Japan.
2-45884  3/1990  Japan.

*Primary Examiner*—Dennis H. Pedder
*Attorney, Agent, or Firm*—Armstrong, Westerman, Hattori, McLeland & Naughton

[57] ABSTRACT

A rear body structure of a vehicle is disclosed which comprises a pair of right and left rear wheel houses and a reinforcing cross member extending between the rear wheel houses, wherein the cross member is comprised of a lower cross member located below a floor panel of the vehicle and an upper cross member located above the floor panel, and wherein the lower cross member, the floor panel and the upper cross member are weld connected together. As a result, the rigidity of the cross member is increased, whereby drumming arising from the vibrations transmitted from suspensions to areas about a bulkhead of the rear body structure may be avoided, and the time required for luggage loading and unloading operations with respect to a luggage compartment may be shortened. Since the upper cross member is designed to have a small height, it also becomes possible to load long articles spanning from the luggage compartment to a rear part of a passenger compartment.

3 Claims, 7 Drawing Sheets

5,829,824

VEHICLE REAR BODY STRUCTURE AND METHOD OF MOUNTING SAME

BACKGROUND OF THE INVENTION

1. Field of the Invention

The present invention relates generally to a vehicle rear body structure and particularly to a structure in the vicinity of a bulkhead (wall separating a passenger compartment and a luggage compartment) and method of mounting the structure.

2. Description of the Related Art

Noises called drumming which results from the vibrations transmitted through suspensions and the like often arise in the vicinity of a bulkhead in a rear body of a vehicle while the latter is running. An arrangement for preventing such drumming is proposed in, for example, Japanese Utility Model Laid-Open Publication No. SHO 64-26582 entitled "Strut Bar Mount Structure" and Japanese Utility Model Laid-Open Publication No. HEI 2-45884 entitled "Automotive Vehicle Body Structure Employing A Vibration Damping Steel Plate".

Reference is initially taken to FIG. 5 showing as prior art the strut bar mount structure of FIG. 1 of Japanese Utility Model Laid-Open Publication No. SHO 64-26582. As shown in FIG. 5, the conventional strut bar mount structure includes a strut bar 100 removably secured between two engaging members 104, 106 which are disposed on or adjacent to a pair of right and left strut towers 102, 102. The strut bar 100 is designed to be capable of being removed so that it may not present a bar upon loading and unloading of luggage in a luggage compartment.

Reference is next taken to FIGS. 6 and 7 which illustrate the prior art as shown in FIGS. 1 and 2 of Japanese Utility Model Laid-Open Publication HEI 2-45884. The automotive vehicle body structure employing the vibration damping steel plate, as shown in FIGS. 6 and 7, includes a plate-shaped bulkhead 114 separating a passenger compartment 110 and a rear luggage compartment 112, which is formed to sandwich a rigid plastic core 117 for preventing the generation of drumming and hence noises. As shown in FIG. 8 corresponding to FIG. 4 of the publication just described, channel-shaped members 125, 126 are connected to the surfaces of the bulkhead 114 for reinforcing the latter.

The strut bar mount structure of Japanese Utility Model Laid-Open Publication No. SHO 64-26582, as shown in FIG. 5, requires detachment of its strut bar 100 to ensure free loading and unloading of a luggage, thus rendering luggage loading and unloading operations tedious and time-consuming.

Since the automotive vehicle body structure employing the vibration damping steel plate of Japanese Utility Model Laid-Open Publication No. HEI 2-45884, as shown in FIGS. 6 through 8, includes the plate-shaped bulkhead 114 which completely separate the passenger compartment 110 and the luggage compartment 112 for preventing the generation of drumming and resulting noises, it is difficult and sometimes impossible for an automobile employing such body structure to carry long articles such as skis, which need to be placed astride the passenger compartment 110 and luggage compartment 112.

SUMMARY OF THE INVENTION

It is an object of the present invention to provide a vehicle rear body structure which is adapted to prevent the generation of drumming in the vicinity of a bulkhead thereof, which shortens the time required for luggage loading and unloading operations, and which allows loading of long articles spanning over the luggage compartment and the rear part of the passenger compartment.

Another object of the present invention is to provide a method of mounting the vehicle rear body structure.

The above objects are met by a rear body structure of a vehicle according to the present invention, which comprises a pair of right and left rear wheel houses and a reinforcing cross member extending between the rear wheel houses, wherein the cross member is comprised of a lower cross member located below a floor panel of the vehicle and an upper cross member located above the floor panel, and wherein the lower cross member, the floor panel and the upper cross member are weld connected together. With this arrangement, it is possible to prevent the generation of drumming to arise from the vibrations transmitted to areas about the bulkhead of the vehicle, because the rigidity of the cross member is increased. It also becomes possible to shorten the time required for luggage loading and unloading with respect to the luggage compartment, because it is unnecessary to provide a separate member, extending through the luggage compartment and hence presenting a bar to such loading and unloading operations, for avoiding such drumming. Since the upper cross member may be rendered to be short (to have a low height), it further becomes possible to load long articles that span from the luggage compartment to the rear part of the passenger compartment.

In a specific form of the invention, the rear wheel houses are connected with the upper cross member by means of a connector member having ends connected with the rear wheel houses and with the ends of the upper cross member by means of bolts. This arrangement achieves effective vibration damping and thus prevents the occurrence of drumming and imparts an increased torsional strength to the vehicle body, whereby driving stability is improved. Further, the level of freedom in the production (welding and assembling steps) is increased compared to where only weld connection is employed since the connector member is joined with the rear wheel houses and the ends of the upper cross member by means of the bolts and the combined weld and bolt connection is employed for the connection of the upper cross member with other members.

The connector member is comprised of brackets to be secured to the rear wheel houses and gussets to be mounted to the brackets by means of bolts.

The lower cross member takes the form of an upwardly-opened channel, and the upper cross member takes the form of a downwardly-opened channel. Accordingly, the upper and lower cross members are laid one over the other to provide a closed space structure, whereby the rigidity of the cross members is improved.

BRIEF DESCRIPTION OF THE DRAWINGS

The present invention will now be described in further detail with reference to the accompanying drawings, in which.

DETAILED DESCRIPTION OF THE INVENTION

Figure 1:
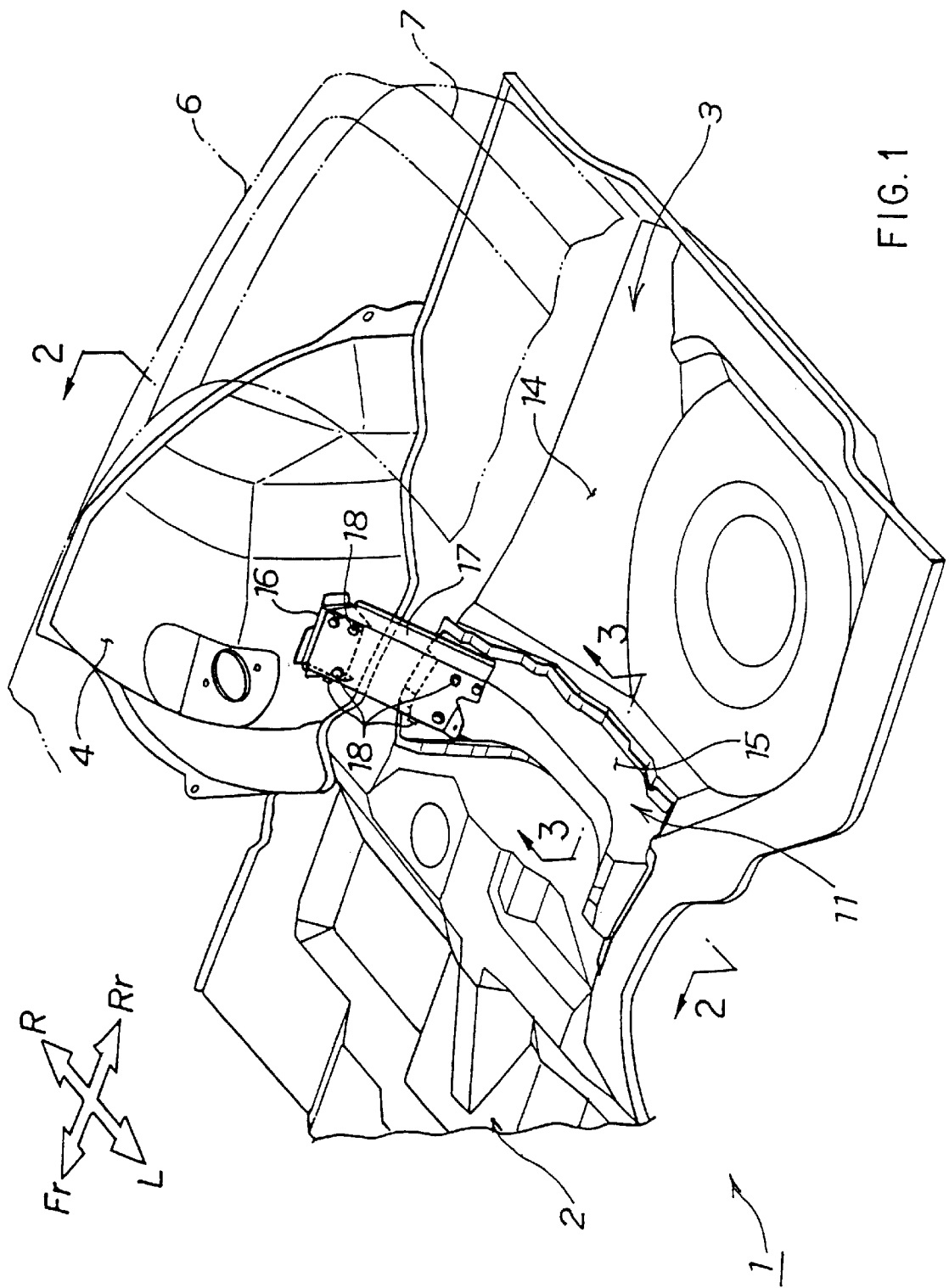
FIG. 1 is a schematic perspective view showing a vehicle rear body structure according to the present invention.

In the drawings, the terms "front", "rear", "right", "left", "above" and "below" represent respective directions as viewed from a vehicle driver. Reference characters "Fr", "Rr", "L", "R" and "CL" respectively represent a front side, a rear side, a left side, a right side and a transverse center of a vehicle.

Referring to FIG. 1, a vehicle body 1 includes in its rear portion a bulkhead (not shown) separating a passenger compartment 2 and a luggage compartment (trunk room) 3.

In the vicinity of the bulkhead, there are provided a pair of right and left rear wheel houses 4, 4 (only a right one shown in FIG. 1), which are reinforced by a cross member 11 disposed therebetween. Reference numeral 6 represents a rear side panel. Designated by reference numeral 7 is a rear panel.

Figure 2:
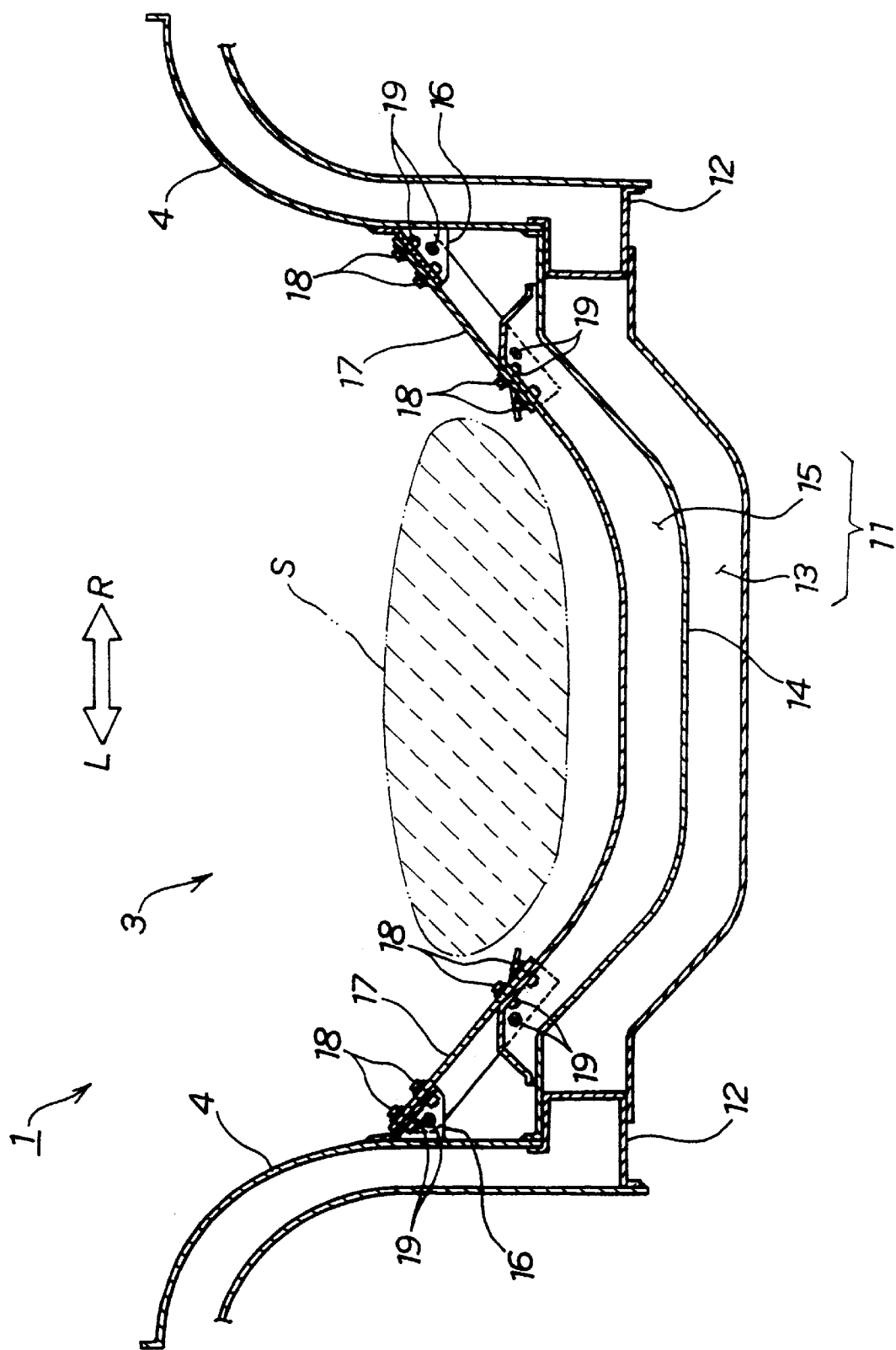
FIG. 2 is a cross-sectional view taken along line A—A of FIG. 1.

Referring to FIG. 2, the cross member 11 is comprised of a lower cross member 13 located below a floor panel 14 and an upper cross member 15 located above the floor panel 14.

On both sides of the vehicle body 1, there are provided right and left side members 12, 12 extending in a front-to-rear direction (longitudinally of the vehicle body 1). A lower cross member 13 extends in a right-to-left direction between the side members 12, 12 and are weld connected thereto, which are in turn weld connected to the rear wheel houses 4, 4. A floor panel 14 is laid on the surfaces of the side members 12, 12 and lower cross member 13. Thus, the lower and upper cross members 13, 15 are connected with each other by means of the floor panel 14.

The lower cross member 13 is downwardly recessed to allow the transversely central portion to be lowered to thereby provide a large space S for the trunk room (luggage compartment) 3.

With ends extending to the vicinity of the side members 12, 12, the upper cross member 15 is shaped similarly to the lower cross member 13 and is thus recessed downwardly so as to allow the transversely central portion to be lowered. The upper cross member 15 has a limited height so as to provide a large space for the trunk room 3, which, in the illustrated embodiment, is substantially equal to the height of the lower cross member 13 (see FIG. 3).

Weld connected to the intermediate portions of the rear surfaces of the rear wheel houses 4, 4 are brackets 16, 16, to which the ends of the upper cross member 15 are connected by means of gussets (connector member) 17, 17. The connection between the rear wheel houses 4, 4 and gussets 17, 17 and the connection between the ends of the upper cross member 15 and gussets 17, 17 are achieved by means of respective bolts 18. Designated by reference numeral 19 are nuts secured to the upper cross member 15 and the rear surfaces of the brackets 16, 16 for receiving the respective bolts 18.

As is apparent from the above, the gussets 17, 17 serve to reinforce the corner portion between the rear wheel houses 4, 4 and cross member 11.

Figure 3:
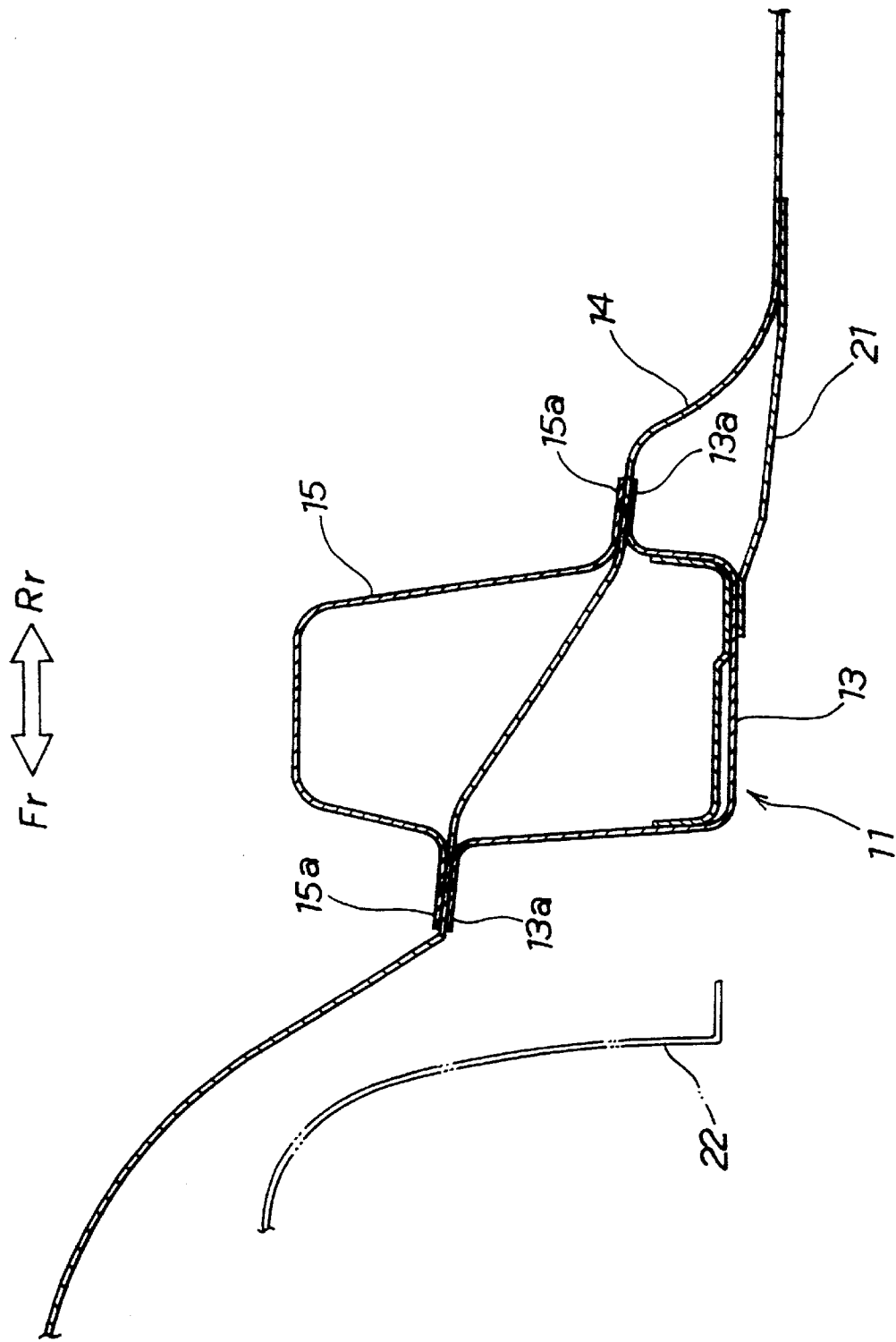
FIG. 3 is a cross-sectional view taken along line B—B of FIG. 1.

Turning now to FIG. 3, the lower cross member 13 has an upwardly-opened, channel-shaped cross section and flanges 13a, 13a at its ends. The upper cross member 15 has a downwardly-opened, channel-shaped cross section and flanges 15a, 15a.

The floor panel 14 is sandwiched between the lower cross member 13 and upper cross member 15 of the cross member 11 and connected with the upper and lower flanges 13a, 15a by spot welding. Thus, the lower cross member 13, floor panel 14 and upper cross member 15 are interconnected with each other.

Since the cross member 11 is formed by laying the channel-shaped upper cross member 15 over the channel-shaped lower cross member 13 to thereby present a closed space structure (box-shaped section), increased rigidity is obtained. The rigidity is further increased by the floor panel 14 arranged to extend through the closed space structure to thereby present two, upper and lower, closed space structures.

Designated by reference numeral 21 is a reinforcing member connected to a lower part of the cross member 11 and the rear surface of the floor panel 14. 22 designates a fuel tank positioned below the floor panel 14.

Figure 4:
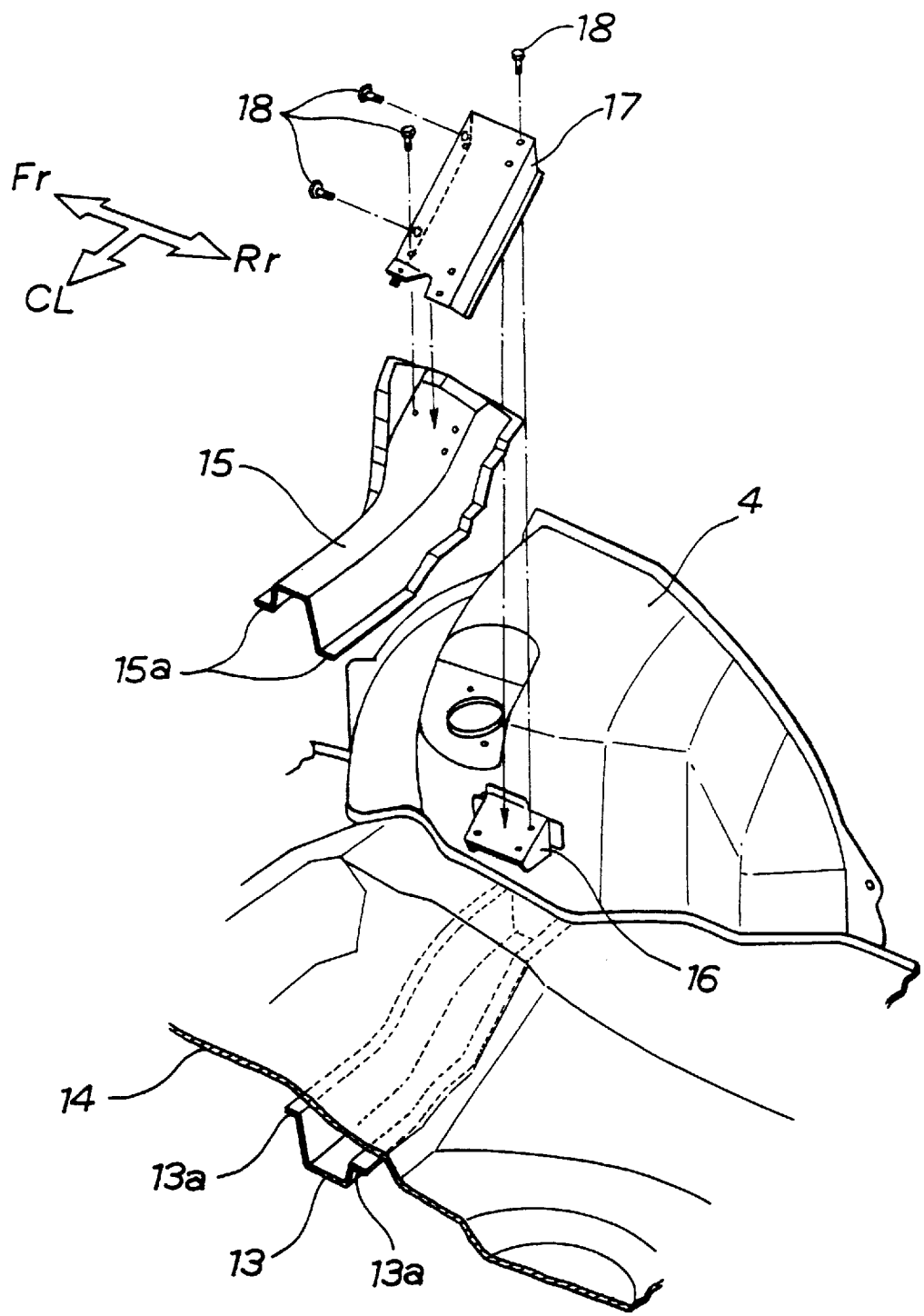
FIG. 4 is an exploded perspective view illustrating a right half of the rear body structure according to the present invention.
Figure 5:
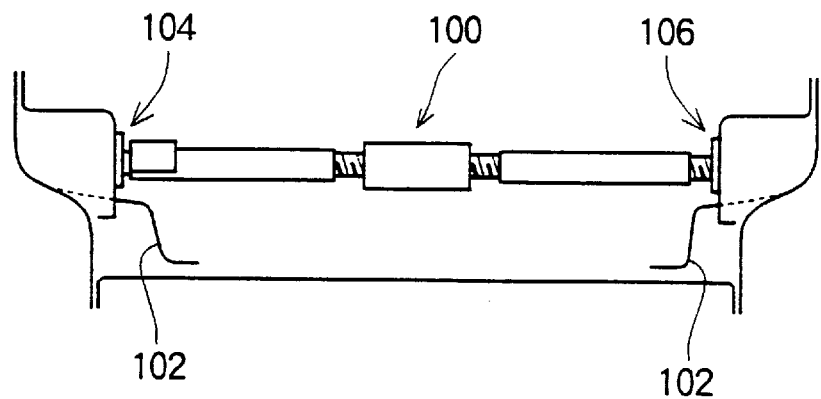
FIG. 5 is a rear elevation view illustrating the general arrangement of a conventional strut bar mount structure.
Figure 6:
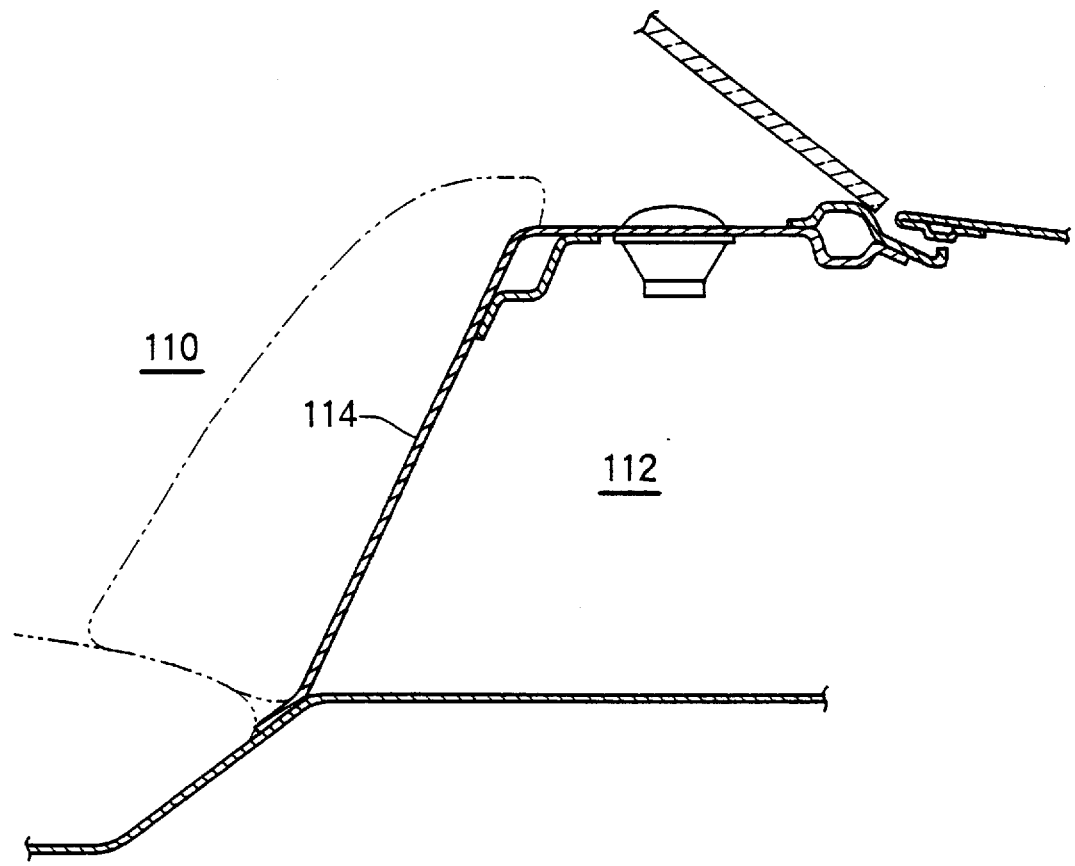
FIG. 6 is a cross-sectional view illustrating another conventional rear body structure.
Figure 7:
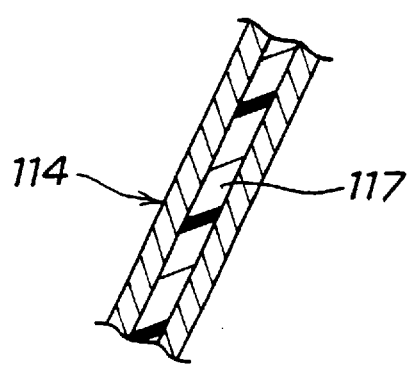
FIG. 7 illustrates on an enlarged scale a bulkhead of FIG. 6.
Figure 8A:
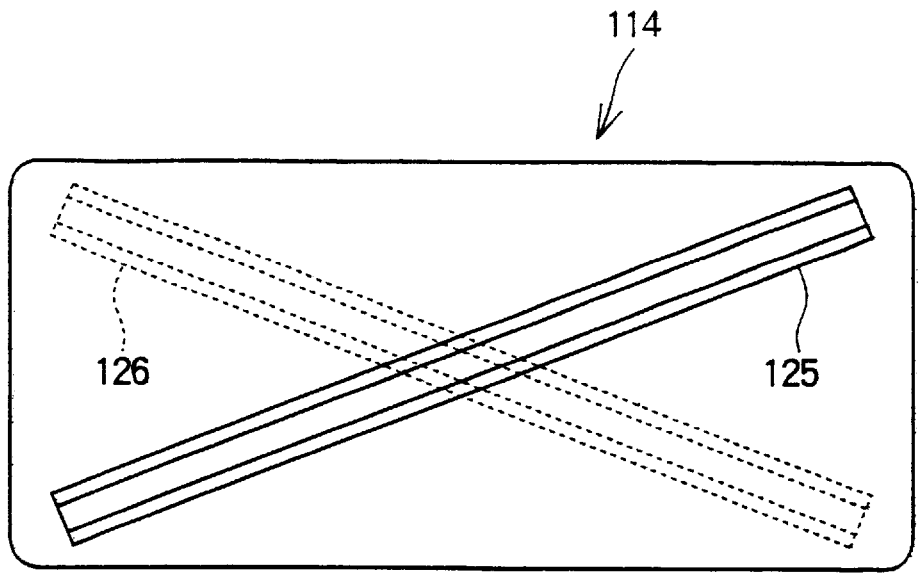
FIG. 8A is a schematic front view illustrating a separate prior bulkhead.
Figure 8B:
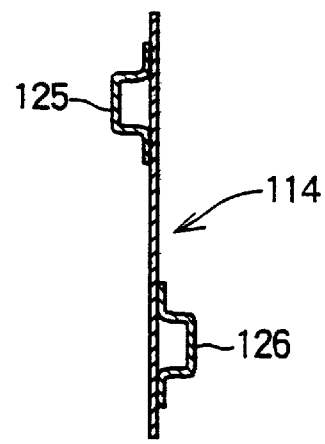
FIG. 8B is a cross-sectional view illustrating the bulkhead of FIG. 8A.

Referring to FIG. 4, the bracket 16 and gusset 17 are in the form of a downwardly-opened channel.

The gusset 17 is placed astride an end portion of the upper cross member 15 and bracket 16 from above and secured by means of the bolts 18 provided at positions displaced in up-and-down and front-and-rear directions. Since they are thus secured by means of a multitude of the differently-positioned bolts, the upper cross member 15, bracket 16 and gusset 17 can be firmly connected with each other, resulting in increased rigidity at the connection.

Discussion will now be made, having reference to FIG. 4, as to the method of mounting the vehicle rear body structure just described.

Firstly, the bracket 16 is weld connected to the rear surface of the rear wheel house 4.

Then, the floor panel 14 is placed upon the lower cross member 13, whereafter the end portions of the lower cross member 13 and floor panel 14 are weld connected to the rear wheel house 4.

Thereafter, the upper cross member 15 is placed upon the floor panel 14, followed by spot welding the lower cross member 13, floor panel 14 and upper cross member 15 together.

Lastly, the gusset 17 is disposed to lie over the end portion of the upper cross member 15 and bracket 16, followed by fastening the respective bolts 18 to connect the end portion of the upper cross member 15 with the gusset 17 and the gusset 17 with the bracket 16.

The mounting method described above is given by way of an illustrative example to assist in understanding of the vehicle rear body structure. Other alternative mounting methods, which can readily be perceived by one of ordinary knowledge in the art, may of course be employed.

Hereinafter, the operation of the vehicle rear body structure and achievable results will be discussed having reference to FIG. 2.

By virtue of the lower cross member 13, floor panel 14 and upper cross member 15 being interconnected by welding, the cross member 11 is imparted increased torsional strength. This further results in increased rigidity at the rear part of the vehicle and enables suppression of noises and particularly drumming to arise from the vibrations in the vicinity of the bulkhead of the vehicle. The cross member 11 suppresses vibration of the floor panel 14 at portions located below a rear seat and around the cross member 11, whereby drumming is sufficiently prevented.

There is no need to provide a separate member extending across the luggage compartment 3 for preventing occurrence of drumming in the vicinity of the bulkhead of the vehicle rear body. Accordingly, time required for luggage loading and unloading operations may be short.

The upper cross member 15 has a sufficiently small height so that loading of long articles, spanning from the luggage compartment 3 to the rear part of the passenger compartment 2 (see FIG. 1), may be enabled.

The rear wheel houses 4, 4 are prevented from being vibrated and hence contributing to the production of drumming in that they are reinforced at their intermediate portions by the upper cross member 15 via the gussets 17, 17.

One may propose to weld connect all of the rear wheel houses 4, 4, cross member 11, side members 12, 12 and floor panel 14 together. However, such manner of connection is inefficient for the production (welding and assembling steps) of the vehicle body 1 in that due consideration needs to be given to the sequence or mode of welding so as to avoid possible weld distortions, and in that it will encounter restrictions resulting from the operational performance of a welding robot.

Therefore, in the illustrated embodiment, the right and left leading ends of the upper cross member 15 are not weld connected to the floor panel 14. Instead, the ends of the upper cross member 15 and the rear wheel houses 4, 4 are connected by means of the gussets 17, 17 with ends secured to the rear wheel houses 4, 4 and the ends of the upper cross member 15 by the respective bolts 18.

As thus far explained, the present invention employs the combined weld and bolt connection, whereby the production of the vehicle body 1 may be carried out with an increased level of freedom.

What is claimed is:

1. A rear body structure of a vehicle, comprising a pair of right and left side members extending front to rear of said vehicle, a pair of right and left rear wheel houses extending along vehicle rear portions of said right and left side members and a reinforcing cross member extending between the rear wheel houses, wherein said cross member is comprised of a lower cross member located below a floor panel of said vehicle and an upper cross member located above said floor panel, and wherein said lower cross member, said floor panel and said upper cross member are weld connected together said lower cross member and said floor panel are weld connected at their opposite ends to said side members, and each of opposite ends of said upper cross member is bolted to one of said rear wheel houses via a connector member that bridges between each of said opposite ends of said upper cross member and the respective wheel house.

2. A rear body structure according to claim 1, wherein said connector member is comprised of a gusset having an end bolted to each of said opposite ends of said upper cross member and an opposite end bolted to a bracket welded to one of said rear wheel houses.

3. A rear body structure according to claim 1 or 2 wherein said lower cross member is in the form of an upwardly-opened channel and said upper cross member is in the form of a downwardly-opened channel.

* * * * *